(12) United States Patent
Toriselli

(10) Patent No.: US 6,257,299 B1
(45) Date of Patent: Jul. 10, 2001

(54) TYRE REMOVAL MACHINE WITH MANUALLY OR AUTOMATICALLY POSITIONABLE TURRET

(75) Inventor: Franco Toriselli, Correggio (IT)

(73) Assignee: Societa' Italiana Costruzioni Elettromeccaniche - S.I.C.E. - S.P.A., Via Mondena (IT)

( * ) Notice: Subject to any disclaimer, the term of this patent is extended or adjusted under 35 U.S.C. 154(b) by 0 days.

(21) Appl. No.: 09/556,801

(22) Filed: Apr. 25, 2000

(30) Foreign Application Priority Data

Apr. 30, 1999 (IT) ............................................... RE99U0016

(51) Int. Cl.[7] ................................................. B60C 25/132
(52) U.S. Cl. ............................................. 157/1.17; 157/11
(58) Field of Search .................................. 157/1.1, 1.17, 157/11

(56) References Cited

U.S. PATENT DOCUMENTS 4,196,766 * 4/1980 Leeper et al. ...................... 157/1.26
5,836,368 * 11/1998 Corghi ................................ 157/1.24

* cited by examiner

*Primary Examiner*—Joseph J. Hail, III
*Assistant Examiner*—David B. Thomas

(57) ABSTRACT

Tire removal machine with manually or automatically positionable turret comprising a casing supporting a rotatable plate provided with self-centering jaws; a vertical column rising to the side of the plate; a shaft slidable horizontally relative to the column and lockable in position; a sleeve rigid with said shaft and within which the tool holder turret slides vertically, said turret being associated with a spring which maintains the turret spaced from said plate; pneumatic means for locking said shaft and said turret in position; and turret operating and locking means controlled independently by two three-way slide valves which can be switched between an active position in which the compressed air feed line communicates with the delivery lines of said turret operating and locking means, and an inactive position in which said delivery lines are connected to a discharge line respectively, said two slide valves being both associated with a single trigger the operation of which switches them into their inactive position.

6 Claims, 6 Drawing Sheets

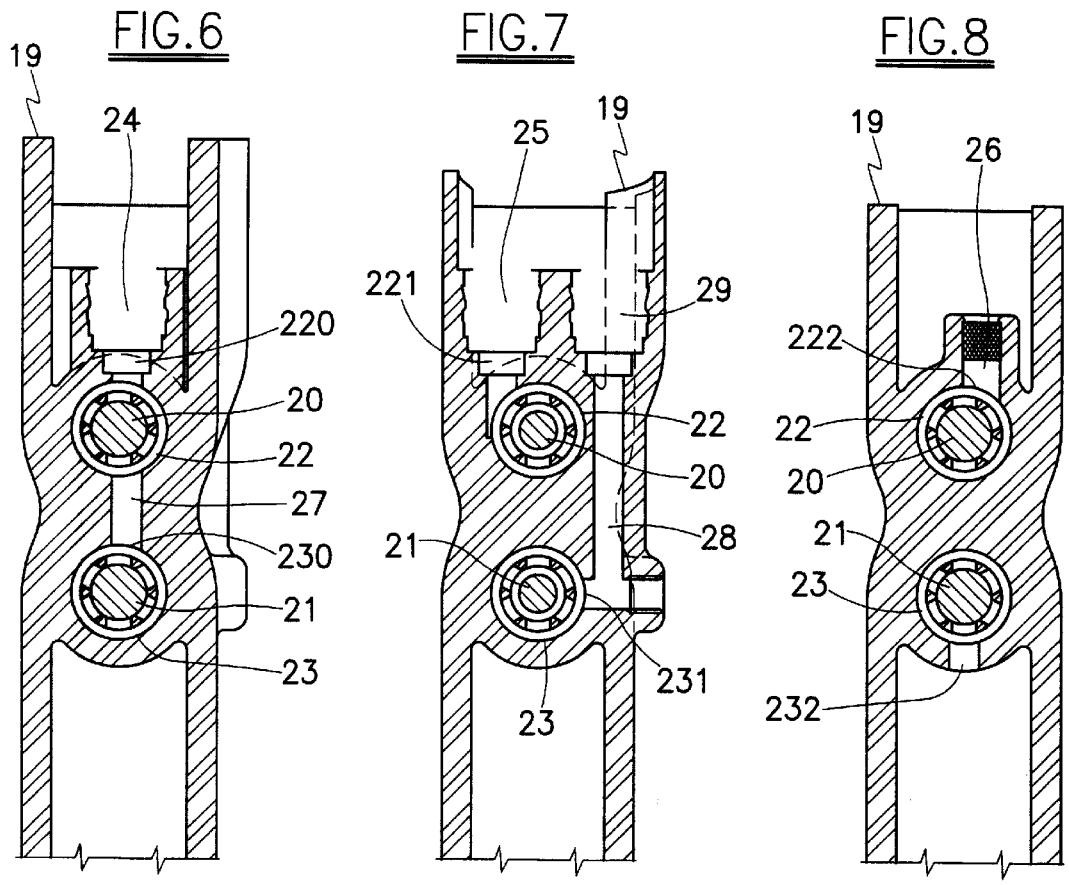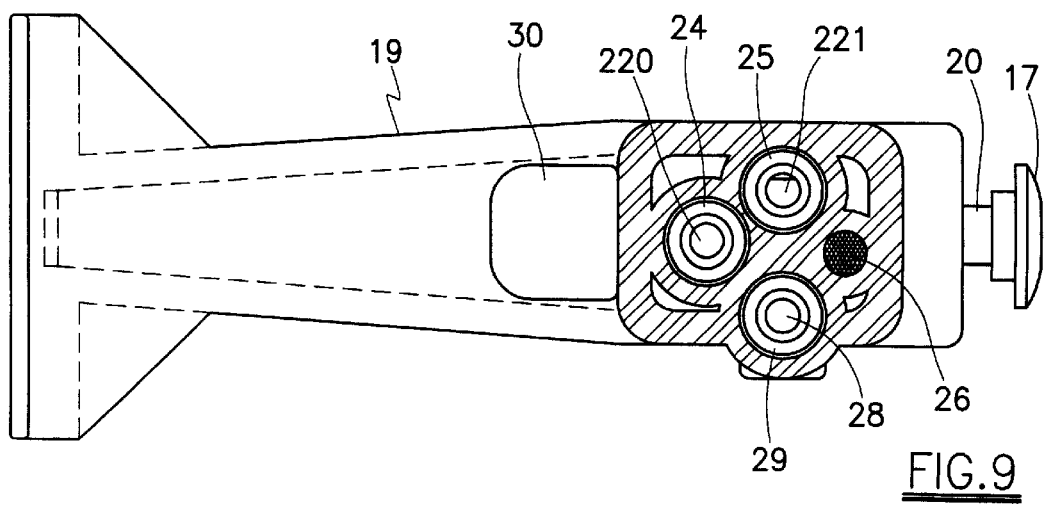

TYRE REMOVAL MACHINE WITH MANUALLY OR AUTOMATICALLY POSITIONABLE TURRET

This invention relates to tyre removal machines and in particular to the means for operating the turret which supports the mounting/removal tool.

Tyre removal machines are known in which the turret supporting the mounting/removal tool is operated manually by the operator against a spring, the purpose of which is to maintain the turret in a raised position.

However, the operator is required to exert a certain force to manually operate the turret, because of which tyre removal machines have been constructed in which the turret is operated by a pneumatic cylinder-piston unit.

This latter type of machine is provided with systems which enable the turret to be positioned automatically in the correct working position. For this purpose the operator causes the turret to descend by means of a suitable push button, and when the mounting/removal tool supported by the turret touches the edge of the wheel rim, a strangling device locks the turret in its correct working position by raising it a few millimetres from the wheel rim edge.

Machines of this type operate perfectly when used on steel wheel rims, however problems arise when they are used on light alloy rims. In this respect, when the mounting/removal tool touches the edge of the wheel rim it can scratch or damage it.

Besides being unattractive, this can prejudice its seal against the tyre bead, in particular for tubeless tyres.

The object of this invention is to overcome the stated drawback within the framework of a rational, reliable and relatively low-cost solution.

The invention attains said object by providing a tyre removal machine in which the turret can be positioned either manually or automatically depending on the type of wheel rim to be subjected to tyre mounting or removal.

The particular characteristics of the invention are defined in the claims.

The constructional and functional characteristics of the invention will be more apparent from the description of a preferred embodiment thereto given hereinafter by way of non-limiting example and illustrated on the accompanying drawings.

FIG. 6 is a section on the line VI—VI of FIG. 3.

FIG. 7 is a section on the line VII—VII of FIG. 3.

FIG. 8 is a section on the line VIII—VIII of FIG. 3.

FIG. 9 is a section on the line IX—IX of FIG. 3.

Figure 1:
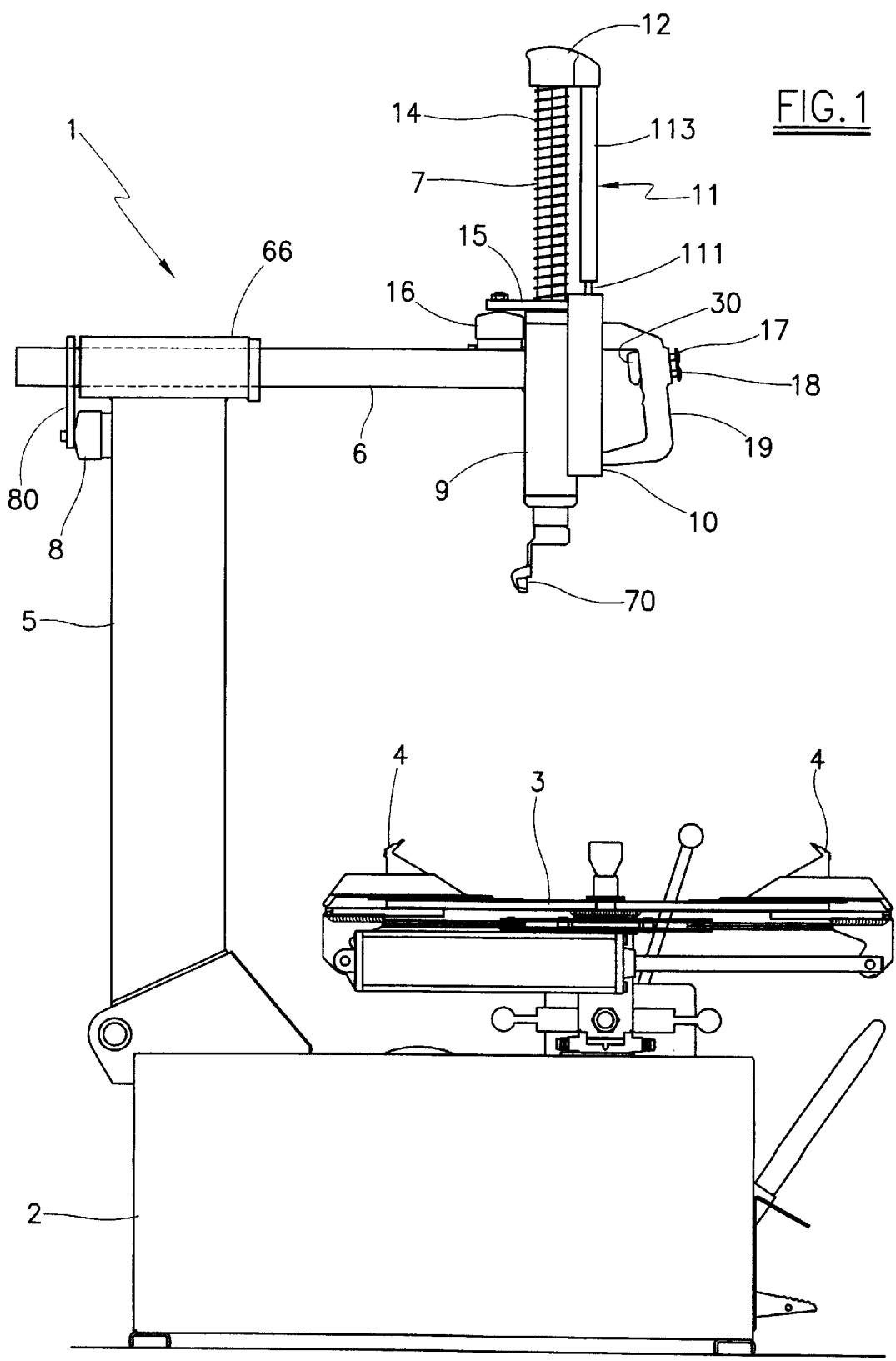
FIG. 1 is a side view of the tyre removal machine of the invention.

FIG. 1 shows the tyre removal machine 1, comprising in brief a casing supporting the usual plate 3 provided with self-centering jaws 4 for gripping the wheel rim. From the rear of the casing 2 there extends a vertical column 5, to the top of which there is fixed a component 66 for guiding a slidable horizontal shaft 6, which supports the usual vertical turret 7 carrying the mounting/removal tool 70.

In detail, the rear end of the shaft 6 is inserted into a strangling plate 80 operated by a cylinder-piston unit 8, for locking the shaft 6 in position. To the front end of the shaft 6 there is welded a sleeve 9 of vertical axis, having a through hole of hexagonal cross-section to receive the turret 7, which has a cross-section matching that of the hole in the sleeve 9.

To the front of the sleeve 9 there is fixed a C-shaped plate 10, which between the front of said sleeve and the base of the plate 10 defines a channel for receiving a single-acting cylinder-piston unit 11 for operating the turret 7 during its automatic operation.

Figure 2:
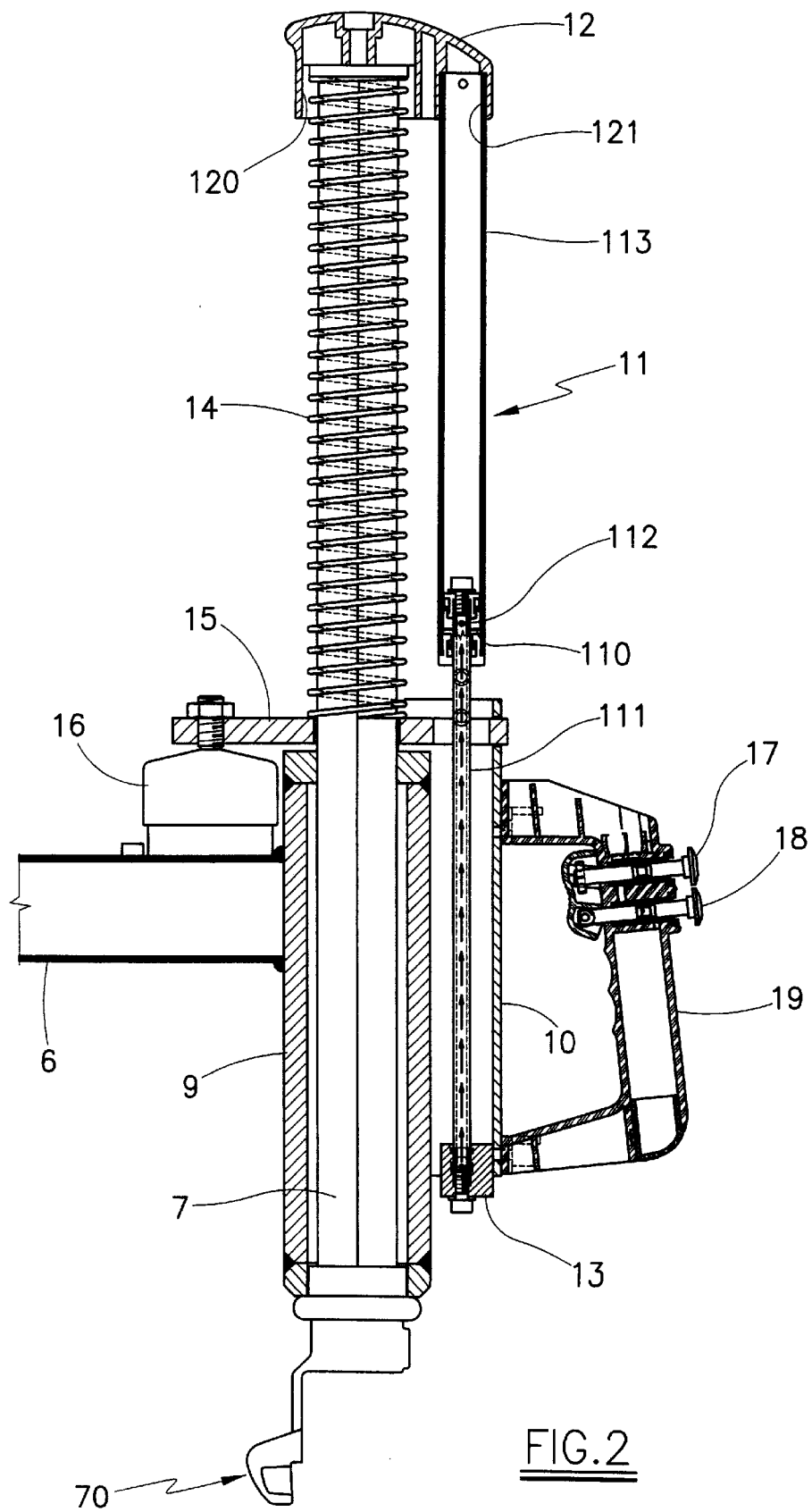
FIG. 2 is an enlarged section through a part of FIG. 1.

Specifically, as shown in FIG. 2, the turret 7 is connected to the cylinder-piston unit 11 by a piece 12 provided with a cavity 120 for receiving the upper end of the turret 7 and a cavity 121 for receiving the rear of the cylinder-piston unit 11. The rod 111 of said cylinder-piston unit 11 is fixed to the plate 10 by a block 13.

The cavity 120 also has a seat for receiving the end of the spring 14, which is coaxial to the turret 7, and maintains the turret 7 in its raised position, as shown in FIG. 1 and FIG. 2.

The other end of the spring 14 rests on a strangling plate 15.

The plate 15 is arranged to lock the turret in its working position and is operated by a cylinder-piston unit 16 fixed to the shaft 6 in proximity to the sleeve 9.

The operator automatically positions the turret by operating two pushbuttons 17 and 18 provided in a handle 19 fixed to the plate 10.

The push button 17 controls the operation of the cylinder-piston unit 11 and hence the automatic lowering of the cylinder-piston unit 7, whereas the push button 18 controls both the operation of the cylinder-piston unit 17 to which the strangling plate 15 for locking the turret 7 in its working position is connected, and the operation of the cylinder-piston unit 8 to which the strangling plate 80 for locking the shaft 6 is connected.

Figure 3:
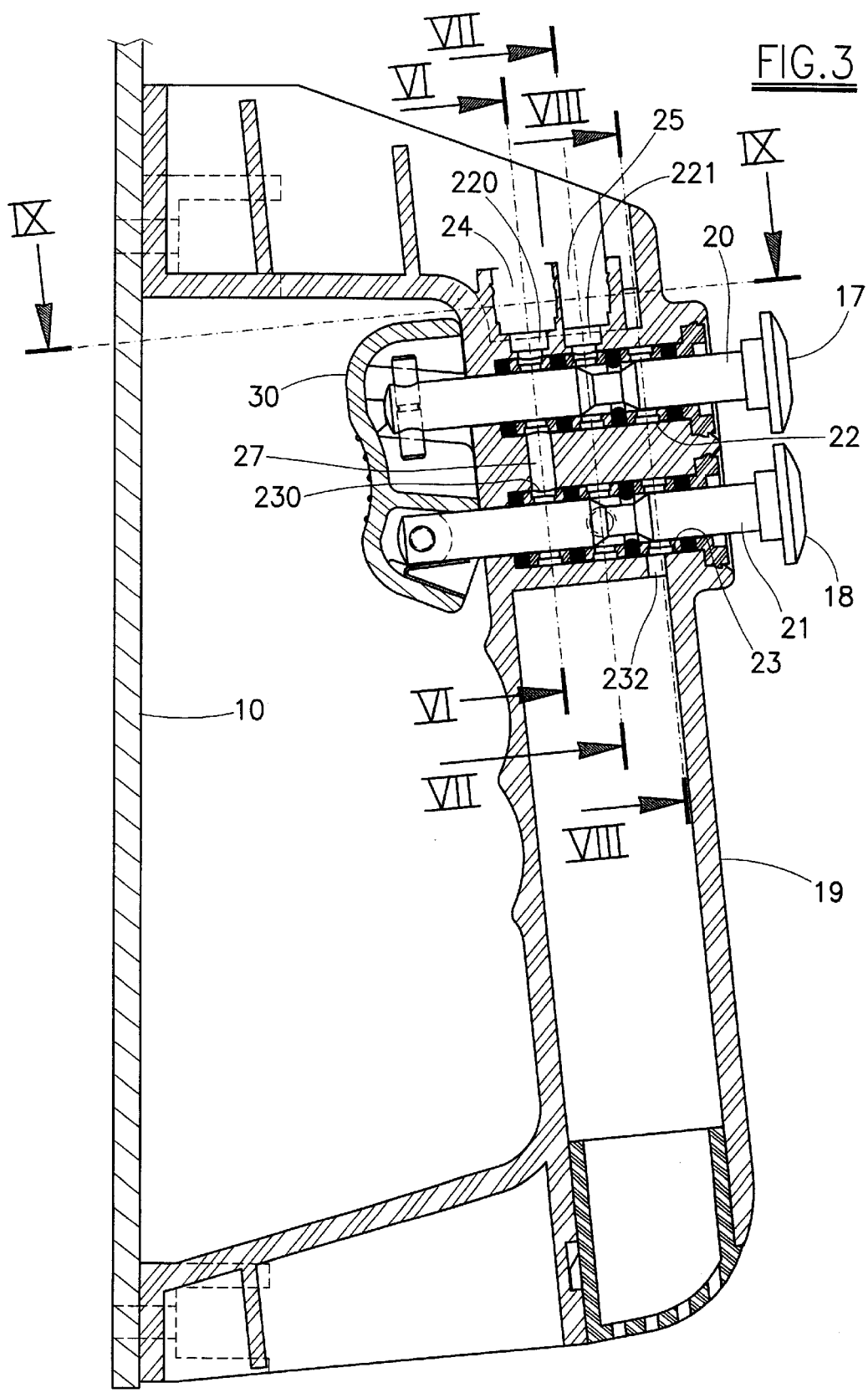
FIG. 3 is a section on a vertical plane through the control handle for operating the tool holder turret, showing the control pushbuttons in their inactive position.

With reference to FIG. 3, the pushbuttons 17 and 18 are connected respectively to two slide valves 20 and 21, the three-way seats 22 and 23 of which are integral with the the handle 19.

The seat 22 has a port 220 communicating with the compressed air fed line 24, a port 221 communicating with the compressed air delivery line 25 to the cylinder-piston unit 11, and a port 222 connected to a discharge line 26, as shown in FIGS. 6, 7 and 8.

From the seat 22 there also extends a channel 27 which opens into the port 230 feeding compressed air to the seat 23. This latter, as shown in FIGS. 6, 7 8, also has a port 231 communicating with the channel 28 connected to the compressed air delivery line 29 to the cylinder-piston units 8 and 16, and a port 232 for discharge to the outside.

The two slide valves 20 and 21 can be switched by the operator independently of each other between an inactive position, shown in FIG. 3, and an active position. To switch from the inactive position to the active position, the operator operates the pushbuttons 17 and 18. To carry out the reverse operation The operator operates a trigger 30 which joins together the front ends of the slide valves 20 and 21, which emerge from the body of the handle.

Figure 4:
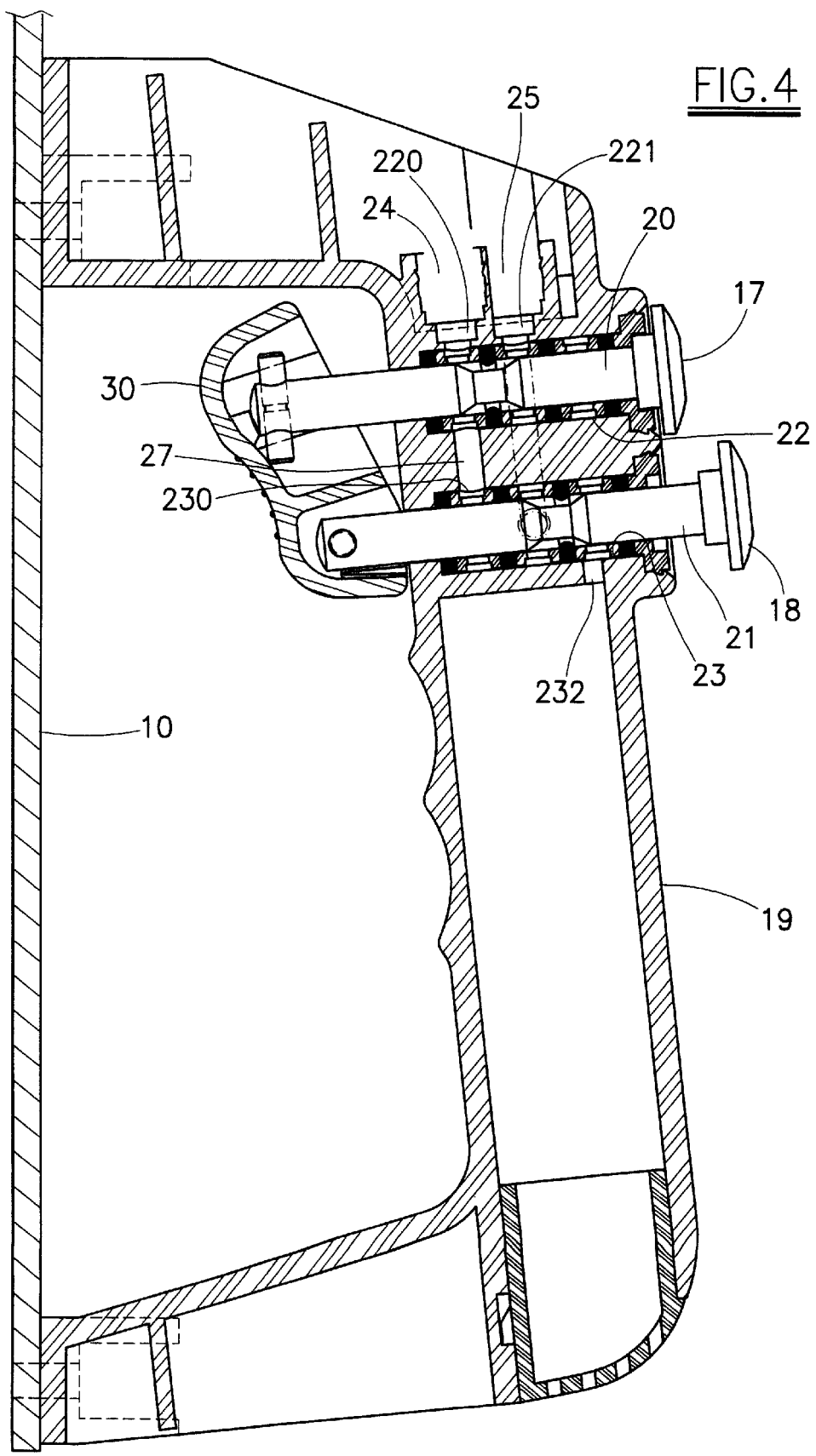
FIG. 4 is a view similar to FIG. 3 but showing the position which the turret control pushbuttons assume during turret descent.

For automatic operation of the turret 7, the operator presses the pushbuttons 17 to move the slide valve 20 into its active position, as shown in FIG. 4. In this manner, the compressed air feed line 24 is connected to the line 25 which delivers compressed air to the cylinder-piston unit 11.

The compressed air is fed into the chamber 110 of the cylinder-piston unit 11 through its rod 111. The line 25 opens into a hole, not shown, present in the lower part of the rod 111, and then feeds the compressed air into the rod. The air emerges from the rod 111 to enter the chamber 110 via a plurality of holes 112, one of which is visible in FIG. 2. On filling the chamber 110 with compressed air, the cylinder 121 of the cylinder-piston Unit 11 is pulled downwards, as is consequently the turret 7.

Figure 5:
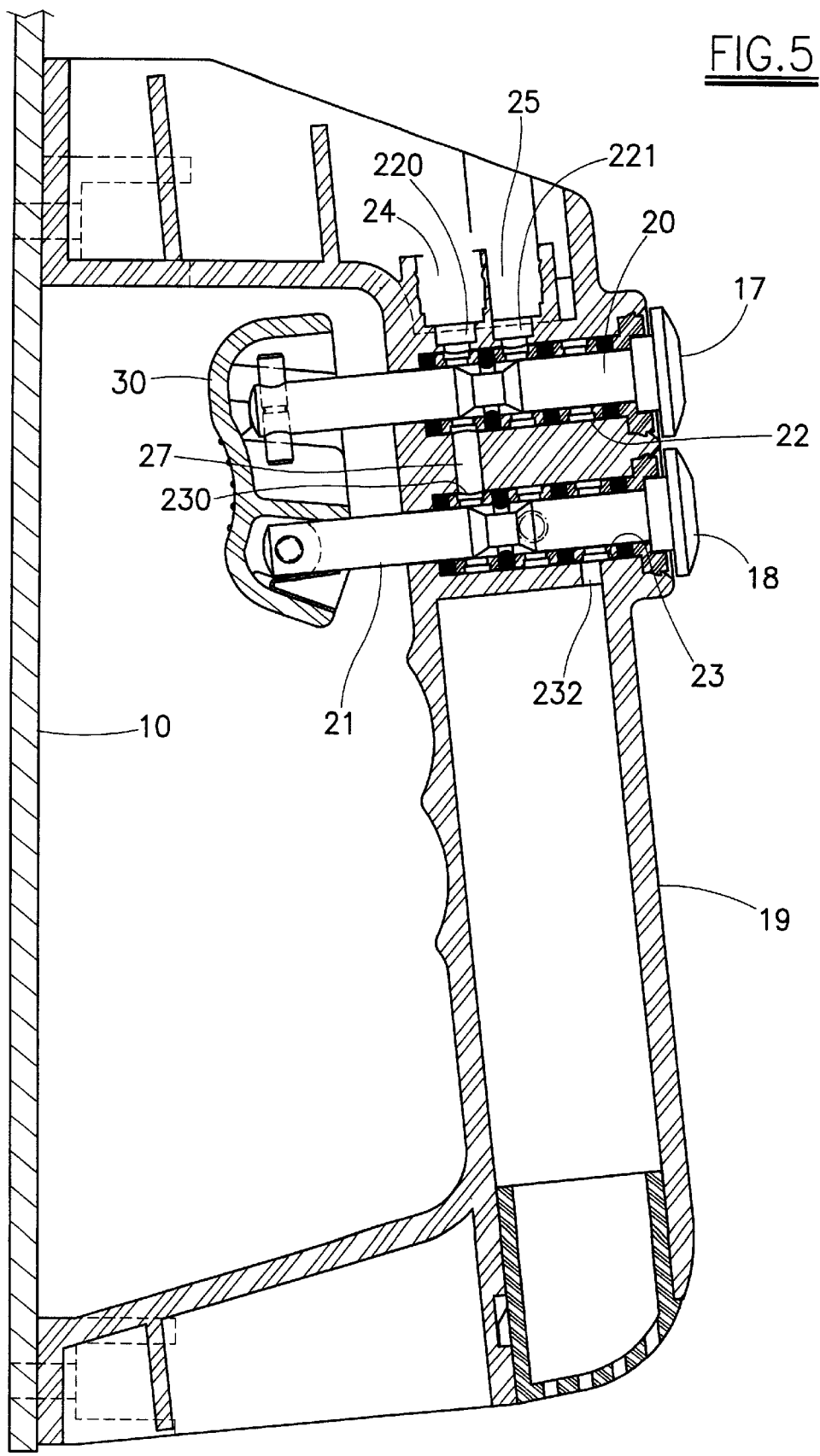
FIG. 5 is a view similar to FIG. 3 but showing the position which the turret control pushbuttons assume when the turret is locked in its working position.

When the tool 70, supported by the turret 7, touches the edge of the wheel rim, the operator presses the pushbutton 18 to switch the slide valve 21 to its active position, as shown in FIG. 5. In this manner the compressed air feed port is connected to the channel 28 delivering to the cylinder-piston units 8 and 16, which operate the strangling plates 80 and 15 respectively, to lock both the shaft 6 and the turret 7 in position.

When the tyre has been mounted on or removed from the wheel rim, the operator returns the turret to its raised position of FIG. 1 by operating the trigger 30. In this manner the two slide valves are switched to their inactive position shown in FIG. 3. In this position the compressed air delivery line 29 to the cylinder-piston units 8 and 16 is connected to the discharge line 232, to enable the compressed air contained in the chambers of said cylinder-piston units to escape, with consequent release of the turret 7 and shaft 6.

Simultaneously the compressed air delivery line 25 to the cylinder-piston unit 11 is connected to the discharge line 26, to enable the air present in the chamber 110 of the cylinder-piston unit 11 to escape, with consequent return of the turret 7 into its raised position by the spring 14.

Manual operation of the turret 7 is extremely simple. The operator merely lowers the turret 7 and locks it in the correct working position by pushing the pushbutton 18 to cause the cylinder-piston units 8 and 16 to operate the strangling plates 80 and 15 respectively. When the tyre has been mounted on or removed from the wheel rim, the operator pulls the trigger 30 to return the slide valve 21 into its inactive position so that the air contained in the chambers of said cylinder-piston units discharges through the discharge port 232, and the plates 15 and 80 return to the position in which they release the turret 7 and shaft 6 respectively, to enable the spring 14 to return the turret 7 into its raised position.

What is claimed is:

1. A tire removal machine with manually or automatically positionable turret comprising a casing supporting a rotatable plate provided with self-centering jaws; a vertical column rising to a side of the plate; a shaft slidable horizontally relative to the column and lockable in position; a sleeve rigid with said shaft and within which the turret slides vertically, said turret being associated with a spring which maintains the turret spaced from said plate; and pneumatic means for locking said shaft and said turret in position, characterised by comprising turret operating and locking means controlled independently by two three-way slide valves which can be switched between an active position in which a compressed air feed line communicates with the delivery lines of said turret operating and locking means, and an inactive position in which said delivery lines are connected to a discharge line respectively, said two slide valves being both associated with a single trigger, the operation of which switches them into their inactive position.

2. A machine as claimed in claim 1, characterised in that said turret operating means are a single-acting cylinder-piston unit.

3. A machine as claimed in claim 1, characterised in that said locking means are a strangling plate operated by a cylinder-piston unit.

4. A machine as claimed in claim 1, characterised in that the seats of said slide valves are integral with a handle.

5. A machine as claimed in claim 1, characterised in that when in its active position that slide valve provided for locking the turret also feeds the means for locking said horizontal shaft.

6. A machine as claimed in claim 5, characterised in that said means for locking said horizontal shaft are a strangling plate operated by a cylinder-piston unit.

* * * * *